United States Patent [19]
Kirchnerova et al.

[11] Patent Number: 5,981,445
[45] Date of Patent: Nov. 9, 1999

[54] PROCESS OF MAKING FINE CERAMIC POWDERS FROM AQUEOUS SUSPENSIONS

[75] Inventors: Jitka Kirchnerova, Montreal; Danilo Klvana, Montréal, both of Canada

[73] Assignee: Corporation de l'Ecole Polytechnique, Montreal, Canada

[21] Appl. No.: 08/668,422

[22] Filed: Jun. 17, 1996

[51] Int. Cl.[6] .............................. H01L 39/00; C01F 17/00
[52] U.S. Cl. .......................... 505/440; 264/614; 264/621; 423/21.1; 423/263; 505/441; 505/490; 505/500
[58] Field of Search ...................... 264/614, 621; 423/21.1, 263; 505/440, 441, 490, 500

[56] References Cited

U.S. PATENT DOCUMENTS

| | | | |
|---|---|---|---|
| 3,551,533 | 12/1970 | Monforte et al. | 264/14 |
| 3,685,163 | 8/1972 | Olt | 34/5 |
| 3,892,610 | 7/1975 | Huzinec | 149/76 |
| 3,916,532 | 11/1975 | Jaeger et al. | 34/5 |
| 4,216,310 | 8/1980 | Wurzburg et al. | 536/109 |
| 4,540,971 | 9/1985 | Kanai et al. | 338/21 |
| 4,962,082 | 10/1990 | Barboux et al. | 505/1 |
| 4,975,415 | 12/1990 | Gusman et al. | 505/1 |
| 5,068,276 | 11/1991 | Suitch | 524/413 |
| 5,171,720 | 12/1992 | Kawakami | 501/80 |
| 5,200,390 | 4/1993 | Howng | 505/1 |
| 5,525,201 | 6/1996 | Wormsbecher et al. | 208/122 |
| 5,530,144 | 6/1996 | Tsurita et al. | 549/259 |
| 5,603,823 | 2/1997 | Kim | 208/113 |
| 5,776,893 | 7/1998 | Borgstedt et al. | 510/511 |

FOREIGN PATENT DOCUMENTS

| | | | |
|---|---|---|---|
| 0309323 | 3/1989 | European Pat. Off. | H01L 39/24 |
| 88/10009 | 12/1988 | WIPO | H01L 39/00 |

OTHER PUBLICATIONS

Libby, W.F. (1971). "Promising Catalyst for Auto Exhaust". *Science*. 171:499–500.
Abstract of Japanese Patent Application No. 80,104,073 (Mitsushito Electric Industrial, Co., Ltd.), published Aug. 9, 1980 from *Chemical Abstracts*, 94, p. 440, abstract No. 22169e (1981).
Meadowcroft, D.B. (1970). "Low–cost Oxygen Electrode Material", *Nature*. 226:847–848.

(List continued on next page.)

*Primary Examiner*—Christopher A. Fiorilla
*Attorney, Agent, or Firm*—Schwegan, Lundberg Woessner & Kluth, P.A.

[57] ABSTRACT

The new preparation process for making fine high specific surface ceramic powders suitable as catalysts or precursors for ceramics uses lanthanum (or other rare earth lanthanide) oxide as one of the precursors. The oxide is mixed with water to form a liquid slurry, whereby it is transformed to the hydroxide by reaction with water. The resulting hydroxide slurry, which can be milled to reduce the particle size and to speed up the reaction, is then combined, while stirring vigorously to assure homogenous mixing, with a solution of required amount of remaining metal nitrate precursors, for example strontium and cobalt nitrates. The reaction between lanthanum hydroxide and transition metal nitrates produces a colored (color depending on the transition metal) slurry consisting of metal hydroxides suspended in aqueous nitrate solution with pH>2. This perovskite precursor slurry is spray-frozen and freeze dried. The freeze-dried material is transformed to perovskite by slow controlled calcination at temperatures above 550° C. For example calcination 12 h at 585° C. and subsequently 4 h at 620° C. produces nearly phase pure perovskite having specific surface area of >10 $m^2/g$, depending on the composition. The perovskite precursor slurry can alternatively be processed first by spray-drying (instead of spray-freezing/freeze-drying) and subsequent calcination.

22 Claims, 6 Drawing Sheets

OTHER PUBLICATIONS

Abstract of Austrian Patent No. 319,190 (Mihaly), published Dec. 10, 1974 from *Chemical Abstracts*, 83, abstract No. 100160j (1975).

Abstract of Japanese Patent Application No. 77,103,422 (Misoguchi), published Aug. 30, 1977 from *Chemical Abstracts*, 88, abstract No. 8596m.

Abstract of European Patent Application No. 191,125 (Muller–Zell), published Aug. 20, 1986 from *Chemical Abstracts*, 105, abstract No. 196170j (1986).

Abstract of German Patent Application No. 3,505,028 (Muller–Zell), published Aug. 14, 1986 from *Chemical Abstracts*, 105, p. 304, abstract No. 138679w (1986).

Abstract of Japanese Patent Application No. 63,277,527 (Naito), published Nov. 15, 1988 from *Chemical Abstracts*, 110, p. 322, abstract No. 178292z (1989).

Abstract of Japanese Patent Application No. 74,118,661 (Nakamura, K.), published Nov. 13, 1974 from *Chemical Abstracts*, 83, p. 77, abstract No. 44802f (1975).

Abstract of Japanese Patent Application No. 01 96,016 (Nakamura, N.), published Apr. 14, 1989 from *Chemical Abstracts*, 112, p. 784, abstract No. 47051p (1990).

Abstract of Japanese Patent Application No. 63 74,904 (Nakano), published Apr. 5, 1988 from *Chemical Abstracts*, 109, p. 143, abstract No. 40294z (1988).

Abstract of Japanese Patent Application No. 60 96,574 (Nissan Motor Co., Ltd.), published May 30, 1985 from *Chemical Abstracts*, 103, p. 288 abstract No. 182639r (1985).

Abstract of Japanese Patent Application No. 01,192,776 (Ohashi), published Aug. 2, 1989 from *Chemical Abstracts*, 112, p. 348, abstract No. 82870b (1990).

Abstract of Japanese Patent Application No. 02 34,333 (Ohashi), published Feb. 5, 1990 from *Chemical Abstracts*, 113, p. 297, abstract No. 177022m (1990).

Abstract of German Patent Application No. 3,322,889 (Rieser), published Jan. 17, 1985 from *Chemical Abstracts*, 102, p. 295, abstract No. 136666d (1985).

Abstract of Japanese Patent Application No. 60,249,242 (Sadamura), published Dec. 9, 1985 from *Chemical Abstracts*, 104, p. 600, abstract No. 158142y (1986).

Abstract of Japanese Patent Application No. 61,219,760 (Sakai), published Sep. 30, 1986 from *Chemical Abstracts*, 106, p. 309, abstract No. 71900m (1987).

Abstract of Japanese Patent Application No. 62,03,003 (Sato), published Jan. 9, 1987 from *Chemical Abstracts*, 106, p. 128, abstract No. 140520b (1987).

Abstract of German Patent Application No. 3,835,728 (Schumacher), published Apr. 26, 1990 from *Chemical Abstracts*, 113, p. 171, abstract No. 62184y (1990).

Abstract of Japanese Patent Application No. 61,220,719 (Sugano), published Oct. 1, 1986 from *Chemical Abstracts*, 106, p. 731, abstract No. 130500f (1987).

Tejuca, L.G. et al., (1989)"Structure and Reactivity of Perovskite–type Oxides". *Advances in Catalysis* 36:237–328.

Abstract of Japanese Patent Application No. 58 94,756 (Toshiba Battery Co., Ltd.), published Jun. 6, 1983 from *Chemical Abstract*, 99, p. 508, abstract No. 79015j.

Tseung, A.C.C. and H.L. Bevan, "Preparation and Characterisation of High Surface Area Semiconducting Oxides". (1970). *J. Mater. Sci.* 5:604–610.

Voorhoeve, R.J.H. (1977). "Perovskite–Related Oxides as Oxidation–Reduction Catalysts". In Advanced Materials in Catalysis. Eds. J.J. Burton and R.L. Garten, Academic Press, New York, pp. 129–180.

Wachowski, L. (1986). "Influence of the Method of Preparation on the Porous Structure of Perovskite Oxides". *Surf. Coat. Technol.* 29:303–311.

Abstract of Japanese Patent Application No. 03,199,123 (Watanabe), published Aug. 30, 1991 from *Chemical Abstracts*, 115, abstract No. 282977r (1991).

Yamazoe, N. and Y. Teraoka (1990). "Oxidation catalysis of Pervoskite—Relationships to Bulk Structure and Composition (Valency, Defect, etc.)". *Catal. Today* 8:175–199.

Abstract of Japanese Patent Application No. 01,155,963 (Yasuda), published Jun. 19, 1989 from *Chemical Abstracts*, 112, abstract No.89470e (1990).

Abstract of Japanese Patent Application No. 63,159,268 (Yokogawa), published Jul. 2, 1988 from *Chemical Abstracts*, 110, p. 269, abstract No. 12492q (1989).

Abstract of Japanese Patent Application No. 61 86,428 (Yoshida), published May 1, 1986 from *Chemical Abstracts*, 105, p. 331, abstract No. 84054t (1986).

Abstract of Japanese Patent Application No. 62 36,083 (Ando), published Feb. 17, 1987 from *Chemical Abstracts*, 106, abstract No. 161528a (1987).

Abstract of Japanese Patent Application No. 91 126,653 (Aoki), published May 29, 1991 from *Chemical Abstracts*, 115, p. 335, abstract No. 188506q (1991).

Abstract of German Patent Application No. 3,641,788 (Bucerius), published Jun. 9, 1988 from *Chemical Abstracts*, 109, p. 149, abstract No. 131723e (1988).

Abstract of U.S. Patent Application No. 656,917 (Christian), filed Feb. 10, 1976 from *Chemical Abstracts*, 86, p. 114, abstract No. 31649y (1977).

Abstract of Japanese Patent Application No. 63 36,828 (Fukazawa), published Feb. 17, 1988 from *Chemical Abstracts*, 108 p. 102, abstract No. 223618g (1988).

Gallagher, P. K. et al. (1976) "Some Effects of the Source and Calcination of Iron Oxide on Its Sintering Behaviour" *Am. Ceram. Soc. Bull.* 55:589–593.

Abstract of German Patent Application No. 3,712,004 (Glaser), published Nov. 5, 1987 from *Chemical Abstracts*, 109, p. 522, abstract No. 14412s (1988).

Abstarct of German Patent Application No. 3,310,924 (Hausner), published Sep. 27, 1984 from *Chemical Abstracts*, 102, p. 293, abstract No. 11342p (1985).

Abstract of Japanese Patent Application No. 57,196,769 (Ibigawa Electric Industry Co., Ltd.), published Dec. 2, 1982 from *Chemical Abstracts*, 98, p. 312, abstract No. 165878d (1983).

Abstract of Japanese Patent Application No. 57,145,077 (Ibigawa Electric Industry Co., Ltd.), published Sep. 7, 1982 from *Chemical Abstracts*, 98, p. 309, abstract No. 112521a (1983).

Abstract of Japanese Patent Application No. 57,145,078 (Ibigawa Electric Industry Co., Ltd.), published Sep. 7, 1982 from *Chemical Abstracts*, 98, p. 309, abstract No. 112522b (1983).

Abstract of British Patent No. 992,655 (Imperial Chemical Industries Ltd.), published May 19, 1965 from *Chemical Abstracts*, 63, col. 2431 (1965).

Abstract of Japanese Patent Application No. 03,152,165 (Kawamuro), published Jun. 28, 1991 from *Chemical Abstracts*, 115, p. 172, abstract No. 186270 (1991).

Abstract of Japanese Patent Application No. 02,111,624 (Kimura), published Apr. 24, 1990 from *Chemical Abstracts*, 113, p. 162, abstract No. 175049b (1990).

Kirchnervo, J. and D. Klvana. (1994) "Preparation and Characterization of High Surface Perovskite Electrocatalysts" *Int. J. Hydrogen Energy 19*:501–506.

Kirchnerova, J. and D. Klvana. "Preparation and Characterization of High Surface . . . ". Hydrogen Energy, Progress IX Proc. 9th World Hydrogen Energy. Conference, Paris, France. Jun. 22–25, 1992 pp. 485–493.

Klvana, D. and J. Kirchnerova. "Development of Perovskite–type Electrocatalysts by Freeze–Drying Method" C.D.T. Project 1480 École Polytechnique. Final Report. Jan. 1993.

Klvana, D. and J. Kirchnerova, "Developement of Perovskite–type Electrocatalysts by Freeze–drying Method". C.D.T. Project 1480 École Polytechnique, Quarterly Report No. 1, Mar. 1991.

Abstract of German Patent Application No. 3,445,948 (Kurita), published Jul. 4, 1985 from *Chemical Abstracts*, 103, abstract No. 92002y (1985).

Klvana, D., et al., "Combustion of Methane Over $La_{0.66}Sr_{0.34}Ni_{0.3}Co_{0.7}O_3$ and $La_{0.4}Sr_{0.6}Fe_{0.4}Co_{0.6}O_3$ Prepared by Freeze–Drying", *Applied Catalysis A: General*, 109, 181–193, (1994).

PROCESS OF MAKING FINE CERAMIC POWDERS FROM AQUEOUS SUSPENSIONS

FIELD OF THE INVENTION

The present invention relates to a method of production of fine ceramic powders, particularly perovskite powders.

BACKGROUND

Depending on a specific composition, lanthanide oxides-transition metal oxides based perovskites AA'A"BB'B"$O_3$ may exhibit a wide range of technologically important physical properties, such as ferroelectricity, superconductivity, ionic conductivity, oxygen permeability, high catalytic activity. In any particular application of a given perovskite composition exhibiting specific characteristics, well defined powder morphology and homogeneity are required. For example perovskite powders may be suitable as electrocatalysts for oxygen reduction in fuel cells or batteries, for which very fine high specific surface area powders are required.

Multimetal oxides structurally similar to naturally occurring mineral perovskite ($CaTiO_3$) i.e. AA'A"B'B"$O_3$, have for decades been studied for their many interesting physical properties, i.e. diamagnetism, ferromagnetism, ferroelectricity, ion conductivity, oxygen permeability, superconductivity, and catalytic activity. Some of them have found a wide industrial application. In particular, those containing lanthanide and transition metal oxides with the formula $La_{1-x}Sr_xM_yM'_{1-y}O_3$ where M and M' is a transition metal, have attracted attention as catalysts, high temperature fuel cell interconnect materials, or oxygen permeable membranes.

The simplest crudest preparation method, often referred to as ceramic preparation method, consists of mixing the precursor solids, mostly oxides and/or carbonates, and calcining the precursor mixture. Such precursor mixture, even when well homogenized by milling, requires high calcination temperatures often in excess of 1000° C. and long reaction times, as well as considerable intermittent grinding to obtain fine powders. This process produces sintered powders of very low surface area, for many applications insufficient phase and particle size homogeneity, and may introduce impurities by long grinding. Consequently the quality of such powders may be detrimental to obtaining specific required properties. For example to maximize the catalytic activity by increasing specific surface area (SSA), various more complex preparation methods have been proposed, evaluated [4–8], and patented. Freeze-drying, introduced as an excellent laboratory technique for catalyst preparation more than twenty years ago [8], was shown as leading to the best results [6,7]. Indeed, application of freeze-drying in ceramic processing offers many advantages, which are mainly related to preserving a high homogeneity or fine structure. Over the last twenty years, a number of patents involving freeze-drying as part of ceramic processing has been issued [patents 1–39]. Those concerning the preparation of perovskites [patents] describe processes based entirely on solution [7,30,34,40,41]. However, while all solution spray-freezing/freeze-drying methods lead to powders of superior quality, the overall process which consists of several following steps:

1 solution preparation,
2 spray-freezing by atomizing the solution into a liquid nitrogen,
3 vacuum (freeze)—drying of the spray-frozen material at pressures <2 Pa,
4 vacuum dehydration and partial nitrate decomposition at increased temperature (up to ~380° C.), and
5 calcination at optimum temperature and time, is highly time intensive.

Any shortcut in such processes leads to inferior quality powders. In particular, omission of step 4 will necessitate higher calcination (reaction) temperatures and time to achieve complete perovskite phase formation, and will result in coarser powders.

Other methods to produce fine perovskite powders include precipitation of the metal derived perovskite precursor components as hydroxides, carbonates, or as organic complexes with additional reagents. These methods may introduce undesirable impurities and usually require higher calcination temperatures to decompose all carbonates. When the method involves a combination of nitrates and organic compounds, there is a risk of uncontrolled explosion.

Gusman and Johnson (U.S. Pat. No. 4,975,415) describe a cryochemical method of preparing ultrafine particles of high purity superconductive oxides. This method makes use of soluble inorganic or organic salts of cations which may be metal, transition metal, rare earth or alkaline earth cations, preferably nitrates thereof. Oxides are mentioned as being usable in the invention, but are dissolved prior to use. Fine suspension or colloid of salts is contemplated, but such a suspension which is a very dilute mixture [concentration 0.015 to 0.15 M] is not allowed to react; it is immediately atomized. The suspension or colloid is contemplated only because of limited solubility of some precursors and to allow for potential incompatibility. Therefore, it is clear from this reference that solutions are highly preferred to suspensions, and there is no teaching of forming a slurry which is a heavy suspension containing a low amount of water in this reference. A high proportion of water renders necessary long freeze-drying times and, when additionally the salt content is high, the recovered solid is hygroscopic and requires a long time of heating to dehydrate the solid and to decompose the salts prior to calcination.

In another reference GB 2,193,713, Cabot Corp. describes a method of preparing perovskite type compounds, which comprises the steps of obtaining a slurry of hydrous titania into which is introduced a hot solution of barium hydroxide. A high temperature is maintained to obtain by this hydrothermal treatment divalent cation titanate($BaTiO_3$). Barium titanate may be doped with doping agents which include niobium, lanthanum, yttrium and nickel, manganese, iron and cobalt, added to the tetravalent titanium, either in the form of hydrous oxides or of soluble salts, such as nitrates. Dopants are introduced at a proportion of less than 5 mol % of barium titanate to provide a material which has a morphology similar to that of barium titanate. There is no teaching in this reference of the use of a lanthanide oxide as a primary component of a perovskite compound. There is further no teaching of the use of a lanthanide oxide and its conversion to an hydroxide in an aqueous slurry which would be a precursor for producing transition metal based perovskite.

Although the latter reference describes the formation of a slurry, there is no incentive of forming a slurry of trivalent lanthanum oxide (or other lanthanoids) and to use such a slurry in the production of lanthanide based perovskite powders.

There is no teaching in the Gusman and Johnson reference on how to replace a solution by a slurry and eliminate the use of the vacuum dehydration and partial nitrate decomposition step at an increased temperature prior to calcination. There is therefore room for improvement to substantially reduce the time of preparing such perovskite powders.

STATEMENT OF THE INVENTION

It is an object of the present invention to provide a method for making fine high specific surface ceramic powders wherein an oxide is advantageously used in lieu of a salt solution. The in situ reaction with water forms a hydroxide, in an aqueous slurry, which is the precursor of the oxide for synthesis of ceramic powders, and the slurry is processed by freeze-drying or spray-drying. In a preferred embodiment of the invention, a perovskite powder is made starting with a lanthanide oxide.

As opposed to preparation processes which rely on all soluble precursors to make high SSA powders, the use of a solid fine powder of lanthanide oxides or their mixtures (instead of nitrate salt, for example) which is by reaction with water transformed to hydroxide, allows higher precursor/water ratios and automatic pH control, facilitating thereby the freeze-drying step. Furthermore, the freeze-dried material is much less hygroscopic than freeze-dried nitrates, simplifying the handling for subsequent treatment. Indeed, the freeze-dried material of the new process can easily be dry-milled. Most important advantage is the possibility of direct calcination of the freeze-dried mixture at relatively low temperatures without loosing the homogeneity and fine porous morphology of the powder. Processing freeze-dried all nitrates mixture, which remains highly hydrated, requires complete dehydration and partial decomposition under vacuum to obtain single phase powders with high SSA.

Overall, the new process is considerably shorter and less energy demanding, producing also less waste gases from precursor decomposition.

Applications of the new process are the following: perovskite catalysts, superconducting powders, other ceramic powders of similar compositions serving as precursor for ceramic bodies such as oxygen permeable membranes, monoliths etc.

DESCRIPTION OF THE INVENTION

The present invention involves a new process for preparation of rare earth (lanthanide) oxide and transition metal oxide based perovskite-type (or other synthetic multimetal oxides) oxide powders of very fine particle size. The powders prepared by the present invention are suitable as catalysts, electrocatalysts, precursor powders for superconducting ceramics, or for other specialty ceramics such as oxygen permeable membranes or monoliths. These dense ceramics can be produced by first consolidating the precursor powders and sintering. The process of the present invention involves the use of fine lanthanide oxide powders as one of the initial precursor components and comprises following steps:

1. Preparation of a slurry of lanthanide hydroxides, or other insoluble hydroxides formed by reaction of oxides (alkaline earth oxides) with water. This slurry may contain dissolved precursor components (for example strontium nitrate) which do not react with lanthanide hydroxides;
2. Preparation of solution of remaining water soluble metal salt components, preferably nitrates;
3. Combining the slurry of step one and solution of step two while stirring, or milling, and letting the mixture react;
4. Fast freezing such as by spraying and freeze-drying the mixture of step three;
5. Calcining the freeze-dried mixture of step four.

The process may include milling either during the first step, after freeze-drying and/or at the end of the process. It is contemplated that the step four of the described invention, i.e. spray-freezing/freeze drying can be replaced by spray-drying.

Our previously developed method for preparation of perovskite-type catalysts [9–11] and similar to that patented by Gusman and Johnson [41] for superconductor preparation, employed a solution of a stoichiometric mixture of metal nitrates, having optimum concentration and pH, as precursor and consisted of following steps:

1. solution preparation,
2. spray-freezing by atomizing the solution into a liquid nitrogen,
3. vacuum (freeze)—drying of the spray-frozen material at pressures <2 Pa,
4. vacuum dehydration and partial nitrate decomposition at increased temperature (up to ~380° C.) and
5. calcination at optimum temperature and time.

In this method each step requires optimum conditions for high quality powder. To assure high surface area of powder, step 4 (vacuum decomposition) is very important, i.e. increasing significantly the overall preparation time. When step 4 was not included, the perovskite phase was not fully formed (at similar calcination conditions) and surface area was significantly lower.

X-ray powder diffraction analyses of the calcination products revealed that the perovskite structure is formed from the decomposed nitrates via hexagonal mixed lanthanum/strontium oxide, structure similar to that of $La(OH)_3$.

The new process, which is unique, takes therefore advantage of formation of $La(OH)_3$ from $La_2O_3$ by reaction with water. Lanthanum nitrate is now replaced by an equivalent amount of lanthanum oxide. After reacting with water, the resulting lanthanum hydroxide suspension, which may contain strontium nitrate, for example, in solution, is mixed with the solution of the transition metal nitrates, for example cobalt and nickel nitrate. By hydrolysis, large part of the transition metal content is co-precipitated over lanthanum hydroxide. The resulting suspension is then spray-frozen, freeze-dried, and calcined. Alternatively, it is contemplated, the suspension could be spray-dried. Our tests have shown that vacuum decomposition can be eliminated, without having significantly detrimental effect on the resulting powder. Although specific surface area (12 $m^2/g$) was lower than that of the best powder prepared by the solution method (20 $m^2/g$), its catalytic activity was same or better. Furthermore, the drying step is shorter, the freeze-dried material is less hygroscopic and therefore easier to handle, and the vacuum decomposition can be eliminated; the overall preparation process is considerably shorter. Indeed, it is reduced by at least about 40%. The volume of waste $NO_x$ gases is reduced by at least 25%. From the new lanthanide oxide based freeze-dried suspension perovskite phase of a number of compositions is fully formed at even milder calcination conditions (lower temperature or shorter time).

BRIEF DESCRIPTION OF THE DRAWINGS

FIG. 2: Comparison of methane conversion over $La_{0.66}Sr_{0.34}Ni_{0.3}Co_{0.7}O_3$ prepared by the process of the present invention (Example 2) and by all solution spray-freezing/freeze-drying method (comparative example 1a). 1 g catalyst powder, 4% methane in air, 250 $cm^3$/min flowrate. ●) powder prepared by the process of this invention, Example 1,2; ○) powder prepared by the process of comparative Example 1a.

EXAMPLE 1

Figure 1:
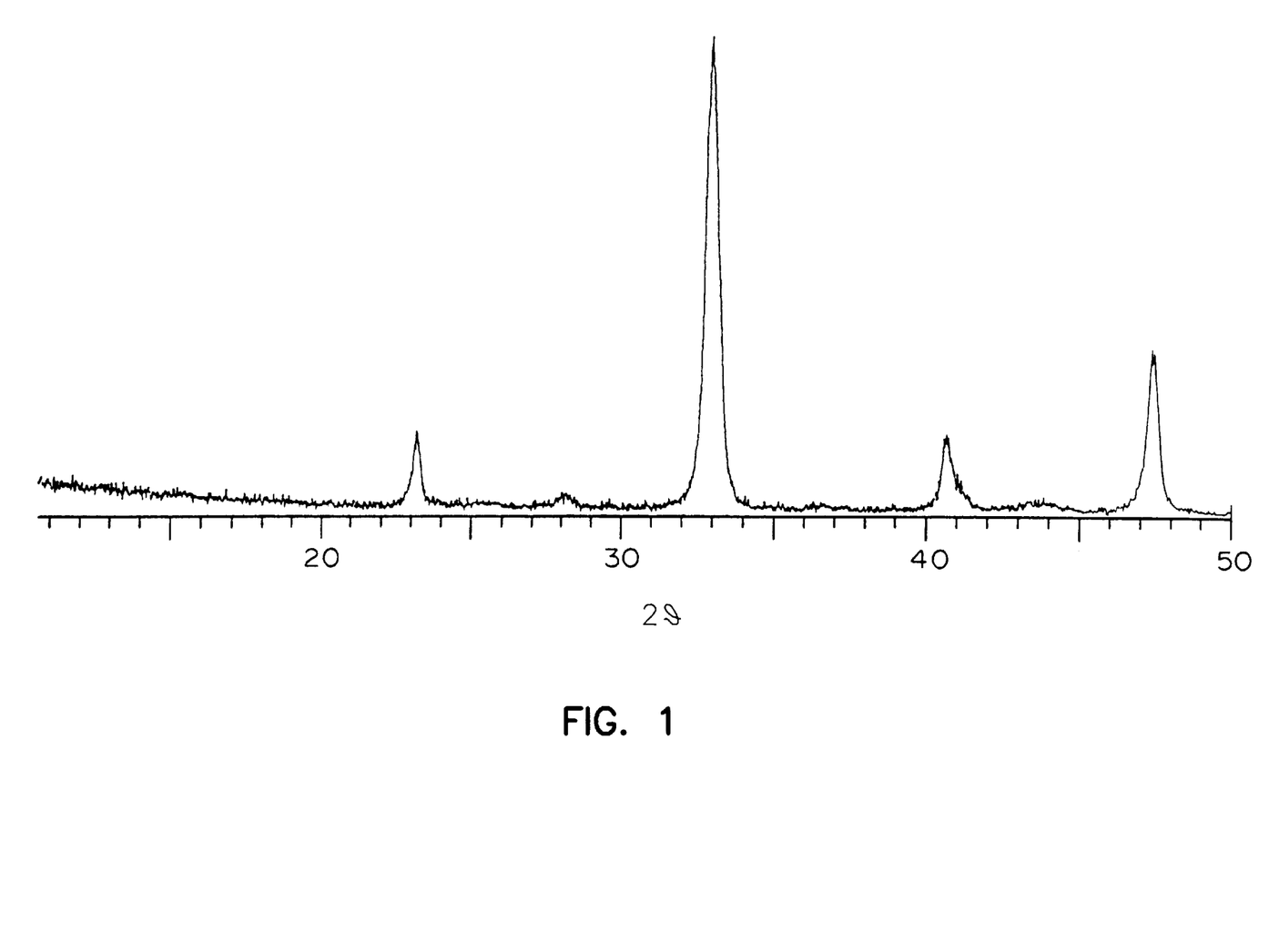
FIG. 1: Powder XRD pattern of the $La_{0.66}Sr_{0.34}Ni_{0.3}Co_{0.7}O_3$ catalyst prepared by the described method; the freeze-dried precursor mixture calcined 10 h at 585° C. and 4 h at 620° C.

Preparation of $La_{0.66}Sr_{0.34}Ni_{0.3}Co_{0.7}O_3$ (0.1 Mole) Catalyst Powder Into a 250 cm$^3$ milling jar containing 130 cm$^3$ grinding balls and 80 cm$^3$ distilled water were successively added 20.373 g (0.07 mole) cobalt nitrate hexahydrate, 8.724 g (0.03 mole) nickel nitrate hexahydrate, 7.195 g (0.034 mole) strontium nitrate, and finally 10.752 g (0.033 mole) lanthanum oxide powder. The jar was well shaken after each addition, and when the last ingredient was added the jar was set for milling for five hours. The resulting slurry was then sprayed by using a (plastic) nozzle into a plastic freezing chamber containing about 1.5 L liquid nitrogen. The frozen particles were separated from the liquid nitrogen by means of a fine screen. Water solvent was removed from the frozen material by sublimation in vacuum (1 Pa). The time allowed for the sublimation step is from 2 to 40 hours, depending on the surface of the material (aliquoting speeds up the process) and the capacity of the vacuum pump of the freeze-dryer. The dry agglomerated material was crushed and calcined at 585° C. for ten hours and at 620° C. for four hours. Powder XRD analysis indicated that the resulting material was nearly phase pure having perovskite structure (FIG. 1). Calcination of the freeze-dried mixture produced 0.268 mole NO$_x$ (corresponding to approx. 5.5 liters)

EXAMPLE 2

Figure 2:
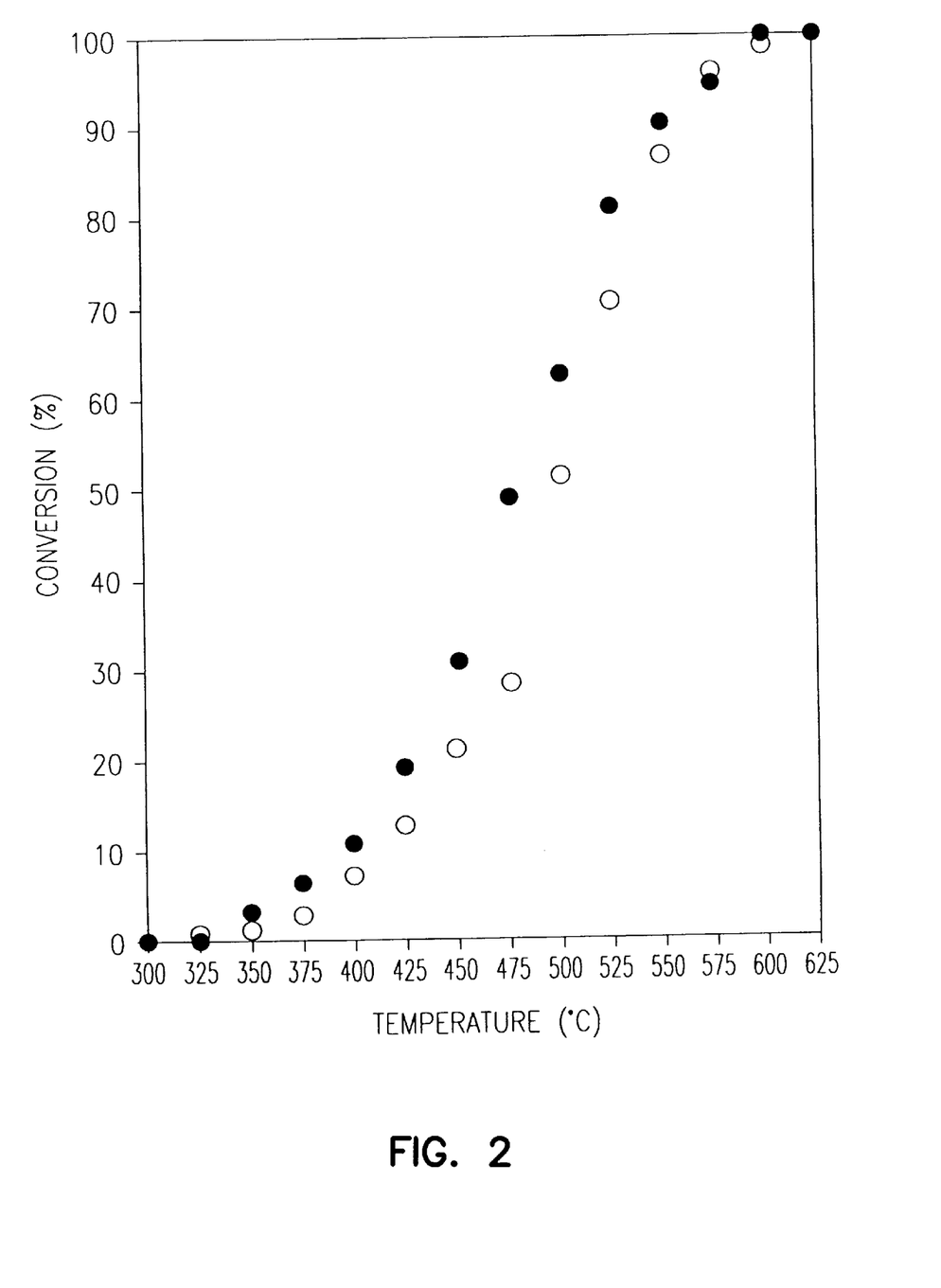

Alternative Preparation of $La_{0.66}Sr_{0.34}Ni_{0.3}Co_{0.7}O_3$ Catalyst Powder 21.6 g strontium nitrate (0.102 mole) was dissolved in about 60 ml of distilled water, and this solution was poured over 32.26 g lanthanum oxide in a 150 cm$^3$ beaker and left to react. By the exothermic reaction between lanthanum oxide and water to form lanthanum hydroxide (0.099 mole) the slurry became thicker. Meanwhile 26.18 g nickel nitrate hexahydrate (0.09 mole) and 61.13 g cobalt nitrate hexahydrate (0.21 mole) were dissolved in about 160 cm$^3$ distilled water. The slurry of lanthanum hydroxide in strontium nitrate solution, resulting from reaction of lanthanum oxide with water was then quantitatively blended under vigorous stirring into the solution of nickel and cobalt nitrates. The resulting mixture was further vigorously stirred for about one hour until pourable homogeneous dark green suspension of insoluble metal hydroxides was obtained. This mixture was then further processed by spray-freezing, freeze-drying, dry-milling for about one hour of the freeze-dried agglomerates, and calcination as described in the Example 1. The specific surface area of the resulting powder was 11 m$^2$/g. The powder has shown an excellent catalytic activity for methane combustion (FIG. 2). In Example 2, 0.804 mole (16.5 liters) NO$_x$ were produced.

EXAMPLE 3

Figure 3:
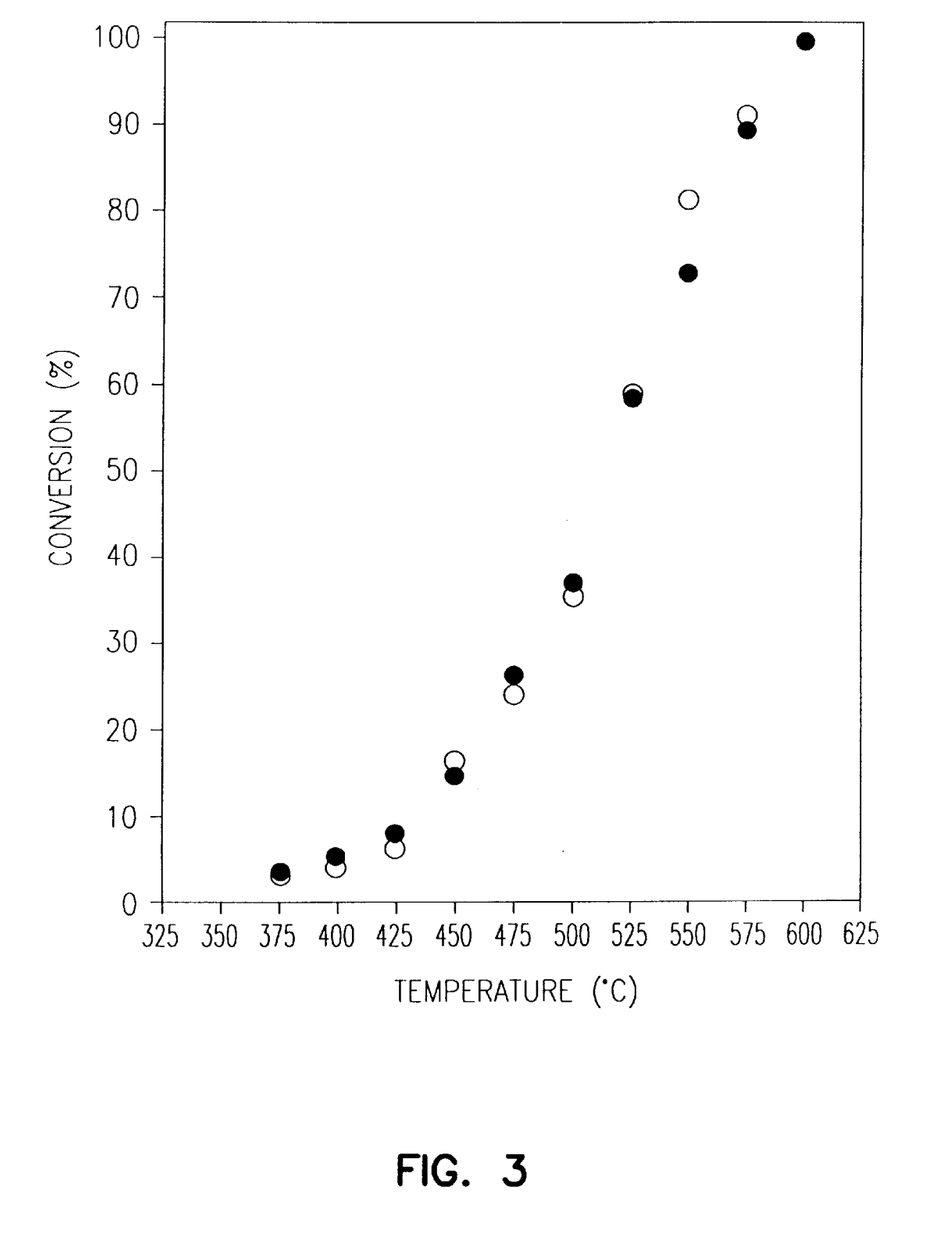
FIG. 3: Methane conversion over alumina pellets supported $La_{0.66}Sr_{0.34}Ni_{0.32}Co_{0.63}Fe_{0.05}O_3$ prepared by the process of this invention (Example 3); 4% methane in air, 250 cm$^3$/min flowrate. ○) as prepared pellets; ●) powdered pellets.
Figure 4:
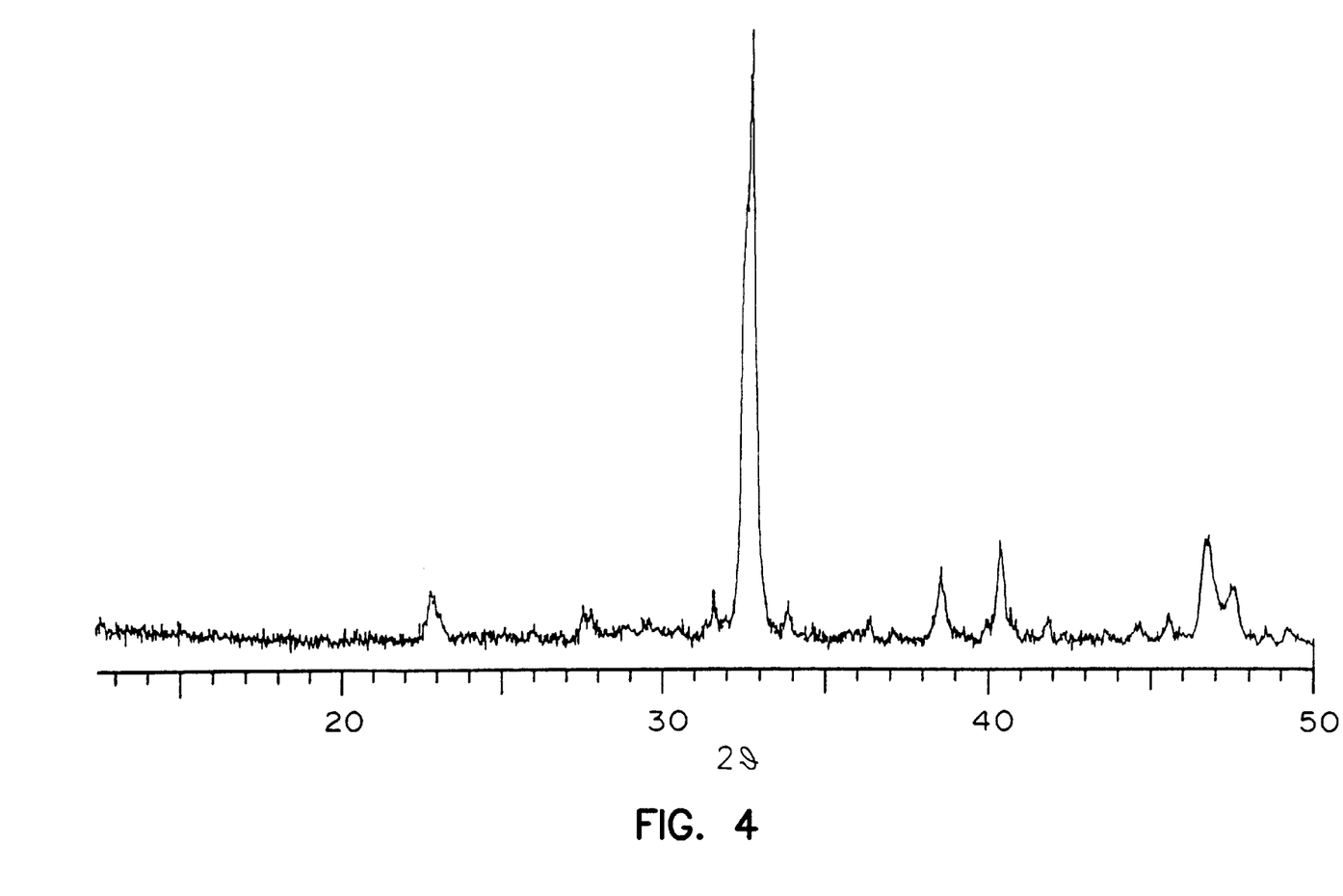
FIG. 4: Powder XRD pattern of the $Y_1Ba_2Cu_3O_7$ ceramic powder prepared by the process of described invention; the freeze-dried precursor mixture calcined 4 h at 620° C. and 10 h at 820° C.

Preparation of 0.3 Mole of $La_{0.66}Sr_{0.34}Ni_{0.32}Co_{0.63}Fe_{0.05}O_3$ Catalyst Powder 21.6 g (0.102) of strontium nitrate was dissolved in about 60 ml of distilled water, and this solution was poured over 32.26 g (0.099 mole) lanthanum oxide in a 150 cm$^3$ beaker and left to react. Meanwhile 27.92 g nickel nitrate hexahydrate (0.096 mole) and 55.1 g (0.189 mole) cobalt nitrate hexahydrate and 6.06 g (0.015 mole) iron nitrate nanohydrate were dissolved in about 140 cm$^3$ distilled water. The slurry of lanthanum hydroxide in strontium nitrate solution, resulting from reaction of lanthanum oxide with water was then quantitatively blended under vigorous stirring into the solution of nickel and cobalt nitrates. The resulting mixture was further vigorously stirred for about one hour until pourable homogeneous dark green suspension of insoluble metal hydroxides was obtained. This mixture was then further processed by spray-freezing, freeze-drying, dry-milling for about one hour of the freeze-dried agglomerates, and calcination as described in the example 1. The specific surface area of the resulting powder was 9.5 m$^2$/g. This powder has been further processed by wet (water suspension) milling, addition of colloidal silica to the suspension, and depositing the perovskite powder slurry on pretreated alumina pellets. The loading of perovskite powder was 7.5%, and the catalyst showed a good catalytic activity for methane combustion (FIG. 3) as well as for toluene oxidation. In preparing 0.3 mole $La_{0.66}Sr_{0.34}Ni_{0.32}Co_{0.63}Fe_{0.05}O_3$, 0.819 mole (corresponding to 16.8 liters) NO$_x$ were produced, e.g. 2.73 mole NO$_x$/1 mole perovskite powder.

EXAMPLE 4

Preparation of $La_{0.66}Sr_{0.34}Ni_{0.29}Co_{0.69}Mn_{0.22}O_3$ Catalyst Powder This powder was prepared by a nearly identical procedure as in Example 2, except for the quantities of precursor materials. In particular, 21.6 g strontium nitrate dissolved in about 60 ml distilled water were combined with 32.26 g lanthanum oxide. 25.4 g nickel nitrate hexahydrate, 60.3 g cobalt nitrate hexahydrate and 1.73 g manganous nitrate hexahydrate were dissolved in about 150 ml distilled water. The slurry of lanthanum hydroxide and the metal nitrates solution was then processed as in Example 2. The specific surface area of the resulting powder was 10 m$^2$/g. In Example 4, 0.804 mole [16.5 liters] NO$_x$ were produced.

EXAMPLE 5

Preparation of $Y_1Ba_2Cu_3O_7$ Powder

To prepare this perovskite composition yttrium oxide, barium peroxide, barium nitrate, and copper nitrate hydrate (Cu(NO$_3$)$_2$ 2.5H$_2$O), all analytical grade, were used as the precursor materials. 88.68 g of copper nitrate (0.381 mole) were dissolved in about 140 ml distilled water. 27.21 g of barium nitrate were dissolved in about 100 ml hot distilled water and transferred into a mixer. Into this solution a well homogenized mixture of 13.6 g (0.127 mole) of yttrium oxide and 22.43 g (0.15 mole) of barium peroxide was added while stirring. Then, after about an hour of stirring the mixer was set at high speed, and the copper solution was added. The thin slurry was left to fully react for two hours. The suspension was then rehomogenized and spray-frozen by atomizing with plastic sprayer into 2 L of liquid nitrogen. The frozen particles were separated from liquid nitrogen by means of a fine screen, and vacuum dried at about 1 Pa. The dry mixture was dry-milled for about half hour and then calcined first 3 h at 590° C., 8 h at 650° C. and finally 8 h at 830° C. The fine black perovskite powder had a specific area 1.1 m²/g. In Example 5, 0.970 mole [19.9 liters] $NO_x$ were produced, as compared to 1.624 mole [33.4 liters] if prepared by the method of Gusman and Johnson.

EXAMPLE 6

Figure 5:
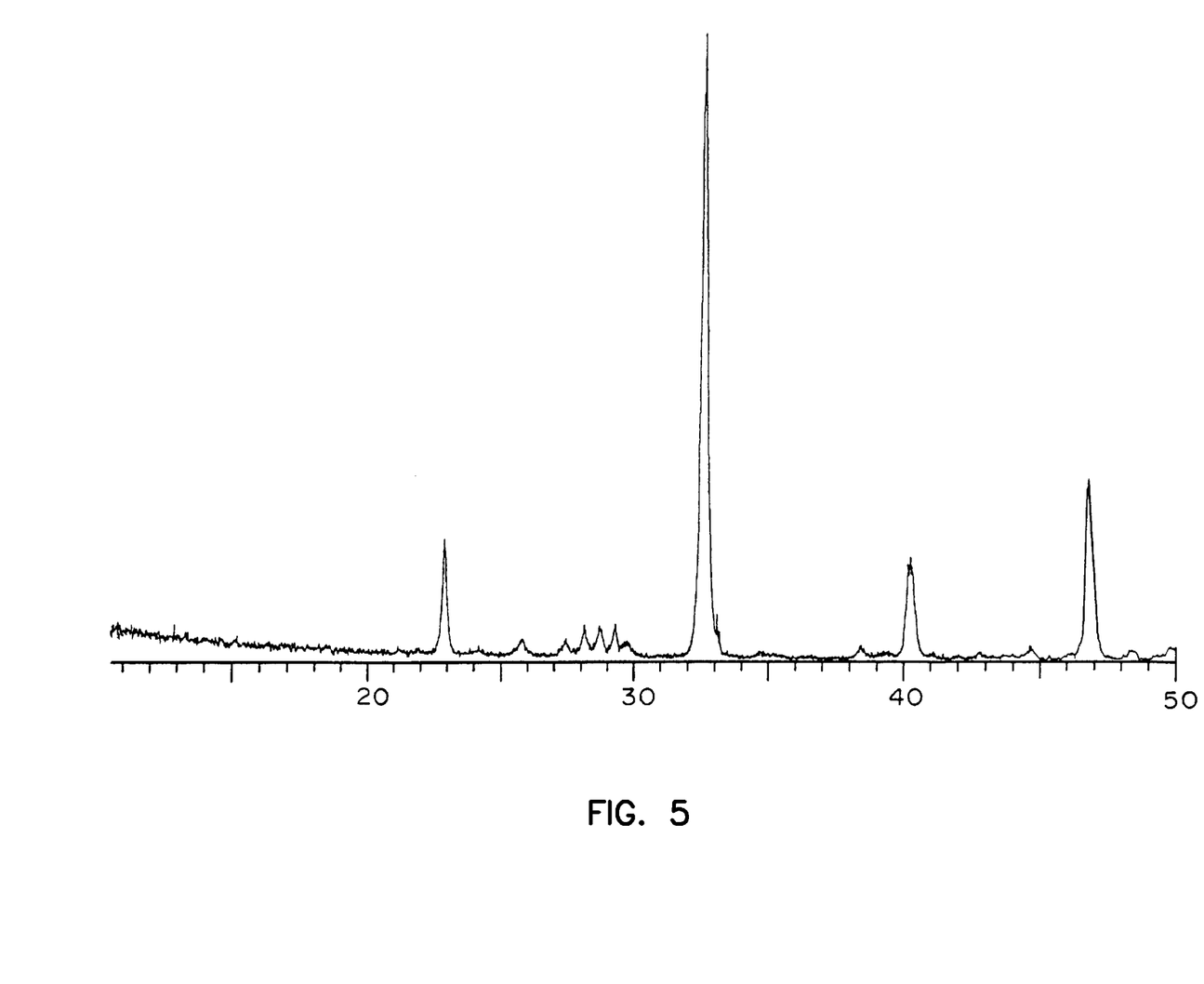
FIG. 5: Powder XRD pattern of the $La_{0.9}Sr_{0.1}Cr_{0.95}Y_{0.05}O_3$ ceramic powder prepared by Example 6.

Preparation of 0.3 Mole $La_{0.09}Sr_{0.1}Cr_{0.95}Y_{0.05}O_3$ Powder 44 g of 99.99% lanthanum oxide (Molycorp) and 1.693 g 99.99% yttrium oxide were thoroughly mixed and then combined with 50 cm³ solution containing 6.35 g of analytical grade strontium nitrate. The mixture was left to react, being transformed into a thick paste. The paste was quantitatively transferred into a 500 cm³ plastic bottle containing zirconia grinding balls, a solution of 114.1 g of chromium nitrate nanohydrate in about 160 ml distilled water was added and the mixture was set for milling. The initially thin suspension transformed in about ten minutes into a dark green translucent looking paste. After about one hour milling the paste was quick-frozen by plunging into liquid nitrogen and vacuum dried at 1 Pa. The dry agglomerates were dry-milled for one hour and then calcined 10 h at 590° C., 4 h at 620° C. and finally 5 h at 820° C. The XRD of the resulting fine brownish-green powder showed a perovskite structure (FIG. 5). Powders of this and similar chromia containing compositions may be suitable as catalysts, or as precursors for interconnect plates for high temperature fuel cells. Other applications may be envisaged. In Example 6, 0.915 mole [18.8 liters] $NO_x$ were produced as compared to 1.77 mole [36.3 liters] if prepared by using solutions of nitrates only.

A pH comprised within about 2 and 8 is considered to be an adequate range of pH values for the reaction. In all the above examples, an optimal pH value of about 4 to about 5 was reached after mixing all the components. When necessary, an agent for adjusting pH may be added, which agent should not interfere with the reaction of the components. The preferred agent for adjusting pH is normally ammonium hydroxide.

Comparative Example 1a

Figure 6:
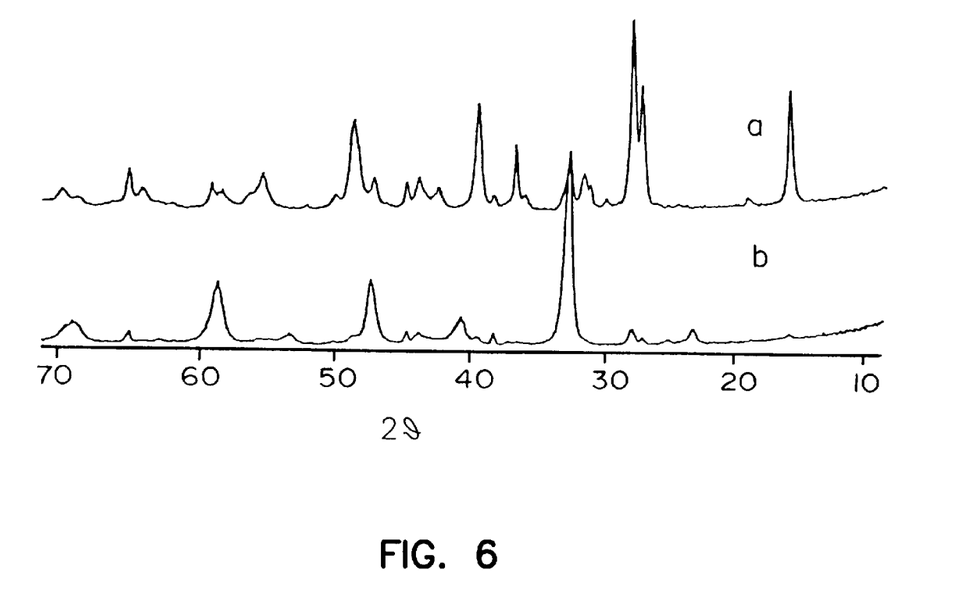
FIG. 6: Powder XRD pattern of $La_{0.66}Sr_{0.34}Ni_{0.3}Co_{0.7}O_3$ prepared by the comparative example 1a(b), and of the material prepared by the comparative Example 1b(a).

Preparation of $La_{0.66}Sr_{0.34}Ni_{0.3}Co_{0.7}O_3$ (0.08 mole) Catalyst Powder by Solution Spray-Freezing/Freeze Drying Method 200 ml of 0.8 M (all metal) solution of precursor hydrated nitrates (lanthanum, strontium, nickel and cobalt) in a proportion corresponding to the formula $La_{0.66}Sr_{0.34}Ni_{0.3}Co_{0.7}O_3$ was prepared by dissolving in distilled water 22.2 g lanthanum nitrate hexahydrate, 5.76 g strontium nitrate, 7 g nickel nitrate hexahydrate, and 16.3 g cobalt nitrate hexahydrate. The solution was spray-frozen by atomizing into 2 L liquid nitrogen with a pressurized glass sprayer producing droplets of 100 μm. The frozen particles were separated from liquid nitrogen by means of fine nylon screen and dried under vacuum (~1 Pa) on a commercial laboratory freeze drier. Vacuum dried dark violet granules, which are very hygroscopic, were then transferred into a decomposition flask and slowly heated under vacuum (<100 Pa) to about 400° C. to completely dehydrate and to decompose large part of nitrates. On a laboratory scale, the time allowed for this step is usually from about 2 to about 8 hours. Water vapour and nitrogen oxides were collected in a liquid nitrogen cooled trap. The agglomerated vacuum decomposed black powder was then calcined in a furnace initially at 585° C. for 12 h and at 620° C. for four hours. The agglomerated powder of nearly phase pure perovskite structure (FIG. 6b) and having specific surface area of 15 m²/g was reduced to submicron primary particles by milling. The catalytic activity for methane combustion was comparable to that of powder prepared by Example 2, but was not better. The overall process of preparation according to this Example was considerably longer than that of the present invention (Examples 1 to 6), required careful handling of the freeze-dried intermediate material, and produced higher volume of nitrogen oxides.

Comparative Example 1b

In order to test the possibility to reduce the length of the preparation process according to comparative Example 1a, the procedure of Example 1a was repeated up to the point of vacuum drying. Then the vacuum dried dark violet agglomerated powder was directly placed into a furnace preheated to 100° C. and calcined at the same conditions as those used in the comparative Example 1a, and in Examples 1, 2, 3, 4. In this case, where the vacuum predecomposition step was eliminated, the resulting black powder was a mixture of binary oxides, and only small portion of perovskite (FIG. 6a), and the powder had specific surface area of only 4 m²/g. In both compositions, 0.368 mole [7.6 liters] $NO_x$, e.g. 4.66 moles $NO_x/1$ mole perovskite powder were produced. In addition, about 40% more water had to be removed during vacuum sublimation for the same quantity of final perovskite powder than in Examples 1 to 4.

Numerous powders can be produced by the process described and claimed by Gusman & Johnson, which powders are not limited to the ones hereinabove exemplified. If we assume that the present process results in the preparation of the same powders as described in this reference, the making of the following perovskite powders is therefore under the scope of the present invention:

$$A_xA'_{1-x}B_yB'_{1-y}O_3 \qquad (I)$$

wherein:

A and A' are each independently selected from the group consisting of lanthanide, lanthanide-alkaline earth cation, lanthanide-lead, lanthanide-silver, lanthanide-alkaline metal and mixtures thereof, B and B' are each independently selected from the group consisting of metal, transition metal, precious metal and mixtures thereof, x is between about 0 to 1, and y is about 0 to 1.

$$AB_2X_3O_n \qquad (II)$$

wherein:

A is selected from the group consisting of lanthanum, yttrium, samarium, europium, gadolenium, dysprosium, holmium and mixtures thereof, B is selected from the group consisting of barium, strontium-calcium, barium-strontium, barium-calcium and thallium.

X is selected from copper, platinum, silver, tin, lead and mixtures thereof, and n is about 7–m, wherein m is 0–1.

$$Ln_{2-x}A_xB_yB'_{1-y}O_4 \qquad (III)$$

wherein:

A is a divalent or monovalent cation,

B and B' are each independently selected from transition metals, x is between about 0 to 1, and y is between about 0 to 1.

This invention has been described hereinabove and variations thereof will be readily apparent to the skilled reader, without departing from the teachings of the invention. These variations are considered to be under the scope of this invention.

REFERENCES

1 D. B. Meadowcroft, "Low-cost oxygen electrode material", Nature, 226 847 (1970).
2 W. F. Libby, Science, 171, 499 (1971).
3 R. J. H. Voorhoeve, "Perovskite-related oxides as oxidation-reduction catalysts", in Advanced Materials in Catalysis, Edit. J. J. Burton and R. L. Garten, Academic Press, New York 1977, p 129–180.
4 L. G. Tejuca J. L. G. Fierro, and J. M. D. Tascón, "Structure and reactivity of perovskite-type oxides", Advances in Catalysis 36, 237–328 (1989).
5 N. Yamazoe and Y. Teraoka, Catal. Today, 8(1990)175.
6 P. K. Gallagher, D. W. Johnson JR., and F. Schrey, Am. Ceram. Soc. Bull., 55(1976)589.
7 L. Wachowski, Surf. Coat. Technol., 29(1986)303.
8 A. C. C. Tseung and H. L. Bevan, "Preparation and characterization of High Surface Area Semi-conducting Oxides", J. Mater. Sci., 5, 604–610 (1970).
9 J. Kirchnerova and D. Klvana, "Preparation and characterization of high surface perovskite electrocatalysts", Hydrogen Energy Progress IX, Proc. of the 9th World Hydrogen Energy Conference, Paris, France, Jun. 22–25, 1992, p 485–494.
10 D. Klvana and J. Kirchnerova, "Development of perovskite-type electrocatalysts by freeze-drying method", C. D. T Project 1480 Ecole Polytechnique, Final Report, January 1993.
11 D. Klvana and J. Kirchnerova, "Development of perovskite-type electrocatalysts by freeze-drying method", C. D. T Project 1480 Ecole Polytechnique, Quarterly Report No 1, March 1991.

Patents (Freeze Drying)

1 Imperial Chemical Industries Ltd. (J. Rowbottom), "Preparation of catalysts by freeze drying.", Brit. 992, 655, May 19, 1965.
2 F. R. Monforte and F. J. Schnettler, "Method of Forming Particulate Material.", U.S. Pat. No. 3,551,533, Dec. 29, 1970.
3 R. I. Olt, "Method of producing fine particle ammonium perchlorate.", U.S. Pat. No. 3,685,163, Aug. 22, 1972.
4 K. Nakamura T. Assai and R. Kanzawa, "Fine silver powder for electric resistor pastes.", Japan. Kokai 74,118, 661, Nov. 13, 1974.
5 A. Mihaly, "Determination of the operating conditions for freeze drying." Austrian 319,190, Dec. 10, 1974.
6 J. R. Huzinec, "Freeze drying process for making ultra-fine ammonium perchlorate.", U.S. Pat. No. 3,892,610, Jul. 1, 1975.
7 E. R. Jaeger and J. T. Miller, "Method of producing particle material by freeze-drying.", U.S. Pat. No. 3,916, 532, Nov. 4, 1975.
8 C. M. Christian, "Thermally stable ammonium perchlorate.", U.S. patent application Ser. No. 656,917, Feb. 10, 1976.
9 N. Mizoguchi, Y. Mitsunaga and K. Sakamoto, "Pigment composition with good dispersibility.", Japan. Kokai 77,103,422, Aug. 30, 1977.
10 Mitsushito Electric Industrial Co., Ltd., "Nonaqueous electrolyte battery.", Jpn. Kokai Tokkyo Kobay 80,104, 073, Aug. 9, 1980.
11 Ibigawa Electric Co., Ltd. "Silicon carbide sinters.", Jpn. Kokai Tokkyo JP 57,145,077 [82,145,077], Sep. 7, 1982.
12 Ibigawa Electric Co., Ltd. "Homogeneous silicon sinters.", Jpn. Kokai Koho JP 57,145,078 [82,145, 078], Sep. 7, 1982.
13 Ibigawa Electric Industry Co., Ltd., "Silicon carbide sintered ceramics with high strength.", Jpn. Kokai Tokkyo Koho JP 57,196,769 [86,196,769], Dec. 2, 1982.
14 Toshiba Battery Co., Ltd. "Silver oxide battery.", Jpn. Kokai Tokkyo Koho JP 58 94,756 [83 94,756], Jun. 6, 1983.
15 H. Hausner and A. Rossen, "Ceramic powders of high sintering activity.", Ger. Offen. DE 3,310,924, Sep. 27, 1984.
16 U. Rieser, "Sintered ceramic articles.", Ger. Offen. DE 3,322,889, Jan. 17, 1985.
17 Nissan Motor Co., Ltd., "Silicon carbon powder for atmospheric sintering.", Jpn. Kokai Tokkyo Koho JP 60 96,574 [85 96,574], May 30, 1985.
18 R. Kurita and S. Hori, "Ceramic aluminum oxide/zirconium oxide powder.", Ger. Offen. DE 3,445,948, Jul. 4, 1985.
19 H. Kanai, T. Takahashi, M. Imai, O. Furukawa, H. Endo, O. Hirao and M. Hayashi, (Toshiba Corp.), "Metal oxide varistor made by a co-precipitation process and freeze-dried.", U.S. Pat. No. 4,540,971, Sep. 10, 1985.
20 A. Sadamura and M. Nakai, "Manufacture of organic-electrolyte battery.", Jpn. Kokai Tokkyo Koho JP 60,249, 242 [85,249,242]. Dec. 9, 1985.
21 I. Yoshida,, M. Watanabe, T. Kyoda and S. Hatanaka, "Manufacture of glasses.", Jpn Kokai Tokkyo Koho JP 61 86,428 [86 86,428], May 1, 1986.
22 A. Mueller-Zell and R. Thomas, "Manufacture of mixed powdered ceramic raw material.", Ger. Offen. DE 3,505, 028, Aug. 14, 1986.
23 A. Mueller-Zell and R. Thomas, "Preparation of mixtures of powdered ceramic raw material with dopants, binders, and solvents.", Eur. Pat. Appl. EP 191,125, Aug. 20, 1986.
24 M. Sakai, K. Naka and K. Otani, "Preparation of ceramic mixtures for injection molding.", Jpn. Kokai Tokkoy Koho JP 61,219,760 [86,219,760], Sep. 30, 1986.
25 T. Sugano and Y. Karita, "Manufacture of magnetic ultrafine particles by freeze drying of suspensions.", Jpn. Kokai Tokkyo Koho JP 61,220,719 [86,220,719], Oct. 1, 1986.
26 G. Sato, M. Komatsu, H. Tanaka and S. Fujii, "Formation of inorganic oxide flakes.", Jpn. Kokai Tokkyo Koho JP 62 03,003 [87 03.003], Jan. 9, 1987.
27 M. Ando and Y. Nakayama, "Manufacture of porous ceramic articles.", Jpn. Kokai Tokkyo Koho JP 62 36,083 [87 36,083], Feb. 17, 1987.
28 D. Glasser, "Phosphorescent material for electroluminescent displays, the electroluminescent display matrices, and their preparation.", Ger. Offen. DE 3,712, 004, Nov. 5, 1987.
29 S. Fukazawa, K. Nishimura and Y. Kimura, "Preparation of dried granules and vacuum-freeze drying apparatus.", Jpn. Kokai Tokkyo Koho JP 63 36,828 [88 36,828], Feb. 17, 1988.
30 T. Nakano, M. Kumagai and R. Uchimura, "Manufacture of fine inorganic powders.", Jpn. Kokai Tokkyo Koho JP 63 74,904 [88 74,904], Apr. 5, 1988.
31 K. M. Bucerius and N. Eisenreich, "Improving the behavior of solid propellants and tube weapon propellants, the propellants and their uses, agents for improving propellants, and the use of the agents.", Ger. Offen. DE 3,641,788, Jun. 9, 1988.

32 T. Kishimoto, S. Hirao, M. Yokoyama and K. Takahama, "Manufacture of porous inorganic articles for thermal insulators.", Jpn. Kokai Tokkyo Koho JP 63,159,268 [88,159,268], Jul. 2, 1988.

33 M. Naito, K. Sakai and M. Okada, "Manufacture of spherical silica glass powder.", Jpn. Kokai Tokkyo Koho JP 63,277,527 [88,277,527], Nov. 15, 1988.

34 N. Nakano, T. Nakano and M. Shimotomai, "Oxide superconductor source suspension and manufacture of oxide superconductor source.", Jpn. Kokai Tokkyo Koho JP 01 96,016 [89 96,016], Apr. 14, 1989.

35 A. Yasuda and N. Yamaga, "Manufacturing of proton conductor film having improved conductivity.", Jpn. Kokai Tokkyo Koho JP 01,155,963 [89,155,963], Jun. 19, 1989.

36 Y. Obayashi, "Manufacture of thin-film ceramic filters.", Jpn. Kokai Tokkyo Koho JP 01,192,776 [89,192,776], Aug. 2, 1989.

37 M. Schumacher, "Method for manufacture of powders with size 1–1000 nm and shaped articles from the powders.", Ger. Offen. DE 3,835,728, Apr. 26, 1990.

38 Y. Ohashi, "Manufacture of honeycomb-structure silicon carbide articles", Jpn. Kokai Tokkyo Koho JP 02 34,333 [90 34,333], Feb. 5, 1990.

39 Y. Kimura and Y. Suzuki, "Freeze-dried potassium fluoride for fluorinations.", Jpn. Kokai Tokkyo Koho JP 02,111,624 [90,111,624], Apr. 24, 1990.

40 P. Barboux and J-M. Tarascon, "Method of making high $T_c$ oxide superconductor particles by adjusting pH value and cationic ratio of admixed solution followed by drying, heating and firming" U.S. Pat. No. 4,962,082, Oct. 9, 1990, U.S. patent application Ser. No. 122,460, Nov. 19, 1987;

41 M. I. Gusman and S. M. Johnson, "Cryochemical method of preparing ultrafine particles of high-purity superconducting oxides", U.S. Pat. No. 4,975,415, Dec. 4, 1990; U.S. patent application Ser. No. 71,977, Jul. 10, 1987.

The embodiments of the invention in which an exclusive property or privilege is claimed are defined as follows:

1. A method of making a high specific surface ceramic powder comprising the steps of:

a) admixing in one or more steps a reactive oxide powder with one or more aqueous solutions which water component reacts with said oxide to form a slurry of hydroxide, at least one of said aqueous solutions further comprising a cation salt, itself comprising an alkaline earth salt and a metal salt, which mixture is allowed to react and results in forming a slurry of particles comprising hydroxides in a solution of cation salts, said slurry of particles having a pH between about 2 and about 8;

b) spray-freezing and freeze-drying, or spray-drying said slurry, whereby dried particles are obtained; and c) calcining the dried particles.

2. A method according to claim 1, wherein after step a), said slurry is milled to speed up reacting and to produce finer particles.

3. A method according to claim 2, wherein after step b), the dried particles are milled before calcination.

4. A method according to claim 1, wherein after step b), the dried particles are milled before calcination.

5. A method according to claim 1, further comprising the step of forming a ceramic shape and sintering into a dense ceramic body.

6. A method according to claim 5, wherein said dense ceramic body is a high temperature superconductor.

7. A method according to claim 5, wherein said dense ceramic body is an oxygen permeable membrane.

8. A method according to claim 1, further comprising the step of shaping a porous monolith and sintering into a mechanically strong porous monolith.

9. A method according to claim 1, wherein said oxide is selected from the group consisting of lanthanide oxide, alkaline earth oxide, barium peroxide and mixtures thereof.

10. A method according to claim 9, wherein said metal salt comprises a transition metal salt or a precious metal salt, or both.

11. A method according to claim 10, wherein said salt is nitrate.

12. A method according to claim 1, wherein said metal salt comprises a transition metal salt or a precious metal salt, or both.

13. A method according to claim 12, wherein said salt is nitrate.

14. A method according to claim 1, wherein said powder has a perovskite structure comprising:

$$A_x A'_{1-x} B_y B'_{1-y} O_3,$$

wherein:

A and A' are each independently selected from the group consisting of lanthanide, lanthanide-alkaline earth cation, lanthanide-lead, lanthanide-silver, lanthanide-alkaline metal and mixtures thereof, B and B' are each independently selected from the group consisting of metal, transition metal, precious metal and mixtures thereof, x is between about 0 to 1, and y is between about 0 to 1.

15. A method according to claim 14, wherein the powder has a perovskite structure essentially consisting of $La_{0.66}Sr_{0.34}Ni_{0.29}Co_{0.69}Mn_{0.02}O_3$.

16. A method according to claim 14, wherein the powder has a perovskite structure essentially consisting of $La_{0.66}Sr_{0.34}Ni_{0.3}Co_{0.7}O_3$.

17. A method according to claim 14, wherein the powder has a perovskite structure essentially consisting of $La_{0.66}Sr_{0.34}Ni_{0.32}Co_{0.63}Fe_{0.05}O_3$.

18. A method according to claim 14, wherein the powder has a perovskite structure essentially consisting of $La_{0.09}Sr_{0.1}Cr_{0.95}Y_{0.05}O_3$.

19. A method according to claim 1, wherein the powder has a perovskite structure comprising:

$$AB_2X_3O_n$$

wherein:

A is selected from the group consisting of lanthanum, yttrium, samarium, europium, gadolenium, dysprosium, holmium and mixtures thereof, B is selected from the group consisting of barium, strontium-calcium, barium-strontium, barium-calcium and thallium, X is selected from copper, platinum, silver, tin, lead and mixtures thereof, and n is about 7–m, wherein m is 0–1.

20. A method according to claim 19, wherein the powder has a perovskite structure essentially consisting of $Y_1Ba_2CU_3O_7$.

21. A method according to claim 1, wherein said powder has a perovskite structure comprising:

$Ln_{2-x}A_xB_yB'_{1-y}O_4$ wherein:
A is a divalent or monovalent cation,
B and B' are each independently selected from transition metals, x is between about 0 to 1, and
y is between about 0 to 1.

22. A method according to claim 1, wherein said powder is a mixture of perovskites and other oxides.

* * * * *

UNITED STATES PATENT AND TRADEMARK OFFICE
CERTIFICATE OF CORRECTION

PATENT NO.: 5,981,445

DATED: November 9, 1999

INVENTOR(S): Jitka Kirchnerova et al.

It is certified that error appears in the above-identified patent and that said Letters Patent is hereby corrected as shown below:

Title page , in attorney line, delete "Schwegan", and insert -- Schwegman--, therefor.
In column 9, line 20, delete "JR.," and insert --Jr.,--, therefor.
In column 9, line 30, delete "494" and insert --493--, therefor.
In column 11, line 1, insert --H. Yokogawa,-- before "T. Kishimoto".
In column 11, line 8, delete the first instance of "Nakano", and insert --Nakamura--, therefor.
In column 12, line 47, delete "$La_{0.09}$", and insert --$La_{0.9}$--, therefor.
In column 12, line 65, delete "$Y_1Ba_2CU_3O_7$", and insert --$Y_1Ba_2Cu_3O_7$--, therefor.

Signed and Sealed this

Twenty-seventh Day of February, 2001

*Attest:*

NICHOLAS P. GODICI

*Attesting Officer*   *Acting Director of the United States Patent and Trademark Office*